(12) United States Patent
Feng

(10) Patent No.: US 6,921,165 B1
(45) Date of Patent: Jul. 26, 2005

(54) SELF-SEALING, NON-GLUED REMOVABLE WATERTIGHT LENS ASSEMBLY METHOD OF A PANORAMIC-VIEW DIVING MASK

(76) Inventor: Li-Jen Feng, No. 22-10, Lane 50, Tian Muu E. Rd., Taipei (TW)

( * ) Notice: Subject to any disclaimer, the term of this patent is extended or adjusted under 35 U.S.C. 154(b) by 0 days.

(21) Appl. No.: 10/867,065

(22) Filed: Jun. 12, 2004

(51) Int. Cl.⁷ .............................................. G02C 1/00
(52) U.S. Cl. ................................. 351/43; 2/428; 2/430
(58) Field of Search ..................... 351/43, 41; 2/428, 2/430, 427, 426

(56) References Cited

U.S. PATENT DOCUMENTS 6,341,863 B1 * 1/2002 Chen-Lieh ................... 351/43

* cited by examiner

Primary Examiner—Hung Xuan Dang
(74) Attorney, Agent, or Firm—Trojan Law Office

(57) ABSTRACT

This watertight lens assembly structure provides panoramic-viewing for a diving mask without having the lenses glued together. The lenses are instead self-sealing, due to an assembly process in which, as the preferred embodiment indicates, at least one frontal lens and at least one side lens are attached to, via a layer of elastic gasket medium, either one or both surfaces of the contacting edges of the frontal and side lenses and a lens assembly ring presses against the frontal lens and side lens simultaneously, forcing compression against the elastic gasket medium at the contacting edges of the two lenses and securing both lenses to the mask frame. The result is a watertight seal, achieved without adhesives, at the contacting edges of the front and side lenses. This process reduces storage space, packaging size and transporting costs during mass production. Also, this non-glued and removable self-sealing lens assembly allows individuals to easily replace a lens that is broken, scratched or corrected for near or far-sighted vision.

7 Claims, 5 Drawing Sheets

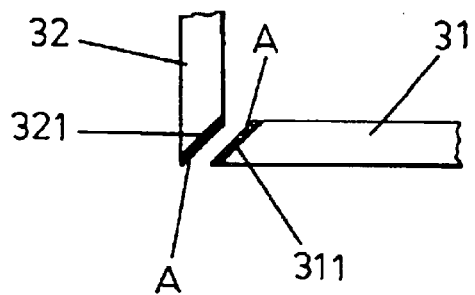
FIG.3~1
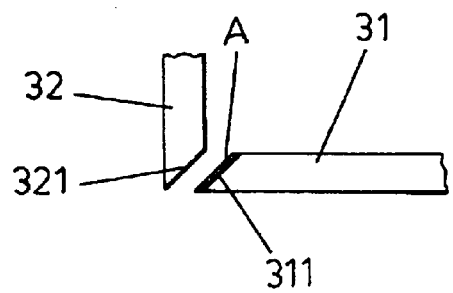
FIG.3~2
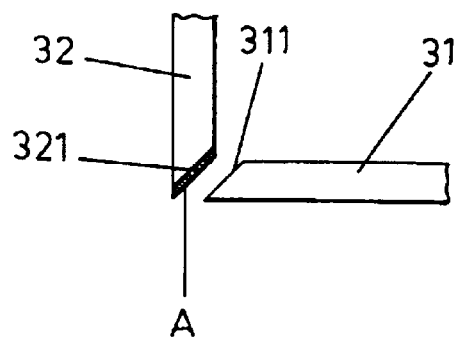
FIG.3~3

SELF-SEALING, NON-GLUED REMOVABLE WATERTIGHT LENS ASSEMBLY METHOD OF A PANORAMIC-VIEW DIVING MASK

BACKGROUND OF THE INVENTION (a) Field of the Invention

This invention improves the assembly process of a diving mask with front lens and side lens, and also enables easier replacement of a broken or scratched lens or even optical-correction lens. This process will reduce costs for storage space, packaging size and transporting of assembled lenses during production.

(b) Description of the Prior Art

A diver's mask may include one or more lenses. More recently lenses on each side of the single- or double-frontal-lens mask have been incorporated to enhance the diver's peripheral vision, thus creating a panoramic viewing of the surrounding environment. In the prior art, to achieve this viewing advantage and watertight seal at the lens joint, other manufacturers have used a permanent adhesive to bond the side and frontal lenses together. Such conventional panoramic-view diving masks are popular in the market. Yet gluing the lenses together has some distinct disadvantages from the manufacturer to the consumer (or end user):

1. For the end user, the replacement of a broken scratched, or prescribed optical-correction lens cannot be done without causing permanent damage—perhaps even rendering the mask non-water-tight—to the bonded edges of the assembled lenses.
2. For the manufacturer, high costs can be associated with the pre-bonding of the front and side lenses resulting in a costly three-dimensional shape lens set-up (usually as L or U shapes) necessary before the lenses can be assembled to the mask frame. The curing time of the adhesive, often many hours, can also be costly. Expensive high-precision equipment is needed during the bonding process to ensure the quality of the three-dimensional bonding shape of the lenses and the watertight integrity of the adhesive bond. And the increased bulk of fixtures for the bonded lenses raise storage space and packaging size in production. These high manufacturing costs are inevitably passed to the consumer.

The objective of this invention is to provide the manufacturer and the end user a more efficient method of assembling panoramic viewing diving masks and also to provide a panoramic viewing diving mask with easily removable lenses.

SUMMARY OF THE INVENTION

This novel panoramic-view diving mask provides a non-glued, completely watertight and removable self-sealing lens assembly (with at least one frontal lens and at least one side lens) in which a layer of elastic gasket medium is attached, or applied, to either one or both surfaces of the contacting edges of the frontal and side lenses. The lens assembly ring is pressed against the frontal lens and the side lens simultaneously, creating compression against the elastic gasket medium and securing the frontal and side lenses to the mask frame for a water-tight seal within the mask without the application of an adhesive to connect the front and side lenses together at the lens contacting edges. With this non-glued, yet watertight and removable self-sealing lens assembly, individual users can easily replace a lens that is broken, scratched or corrected for near- or far-sighted vision. This improved lens assembly process results in reduced storage space, reduced packaging sizes and reduced costs of transportation of the assembled lenses during mass production. To enable further understanding of the stated objectives and the technological methods of the invention herein, a brief description of the drawings below is followed by a detailed description of the preferred embodiments as set forth below.

BRIEF DESCRIPTION OF THE DRAWING

FIG. 3~1 shows a perspective view of the assembly of the frontal lens to the side lens having a lens contact medium applied to the both surfaces of the contacting edges of the lenses, thereby forming a self-sealing and removable lens assembly.

FIG. 3~2 shows a perspective view of the assembly of the frontal lens to the side lens having a lens contact medium applied to only one contacting edge (the frontal lens), thereby forming a self-sealing and removable lens assembly.

FIG. 3~3 shows a perspective view of the assembly of the frontal lens to the side lens having a lens contact medium applied only to the contacting edge of the side lens, thereby forming a self-sealing and removable lens assembly.

DETAILED DESCRIPTION OF THE DRAWINGS AND THE PREFFERED EMBODIMENTS

Figure 1:
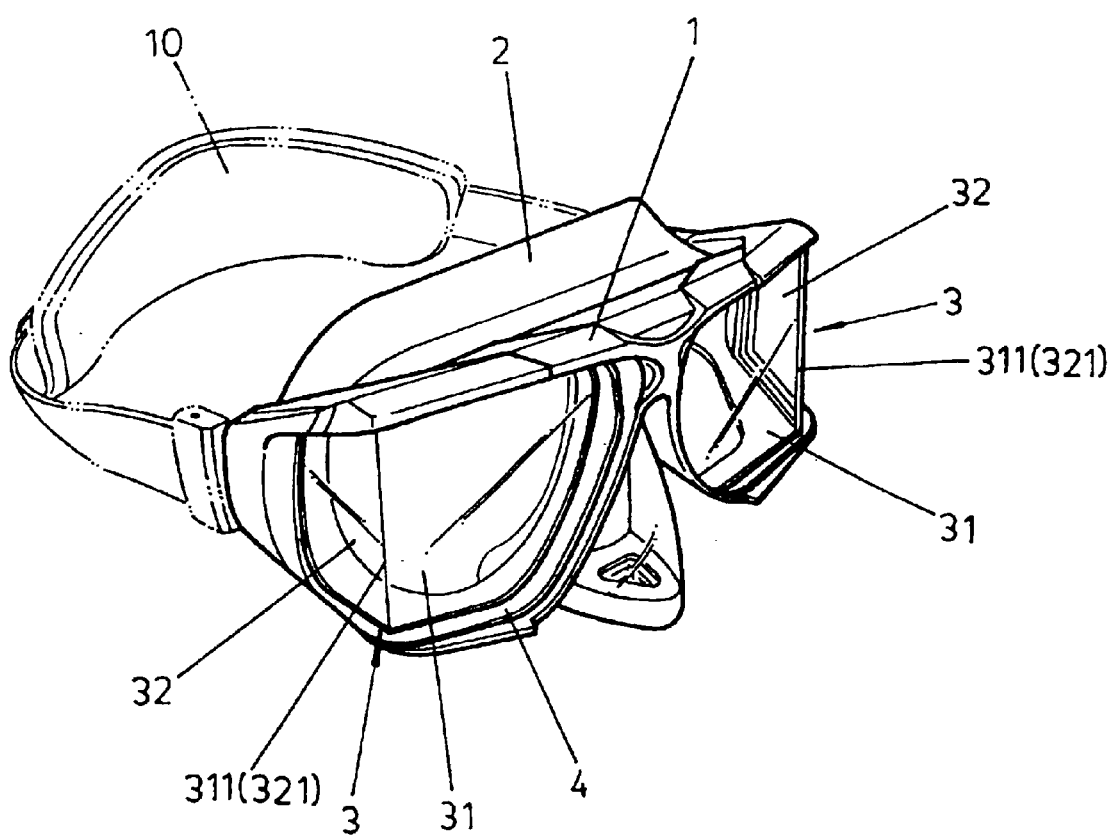
FIG. 1 shows a perspective view of the present invention.
Figure 2:
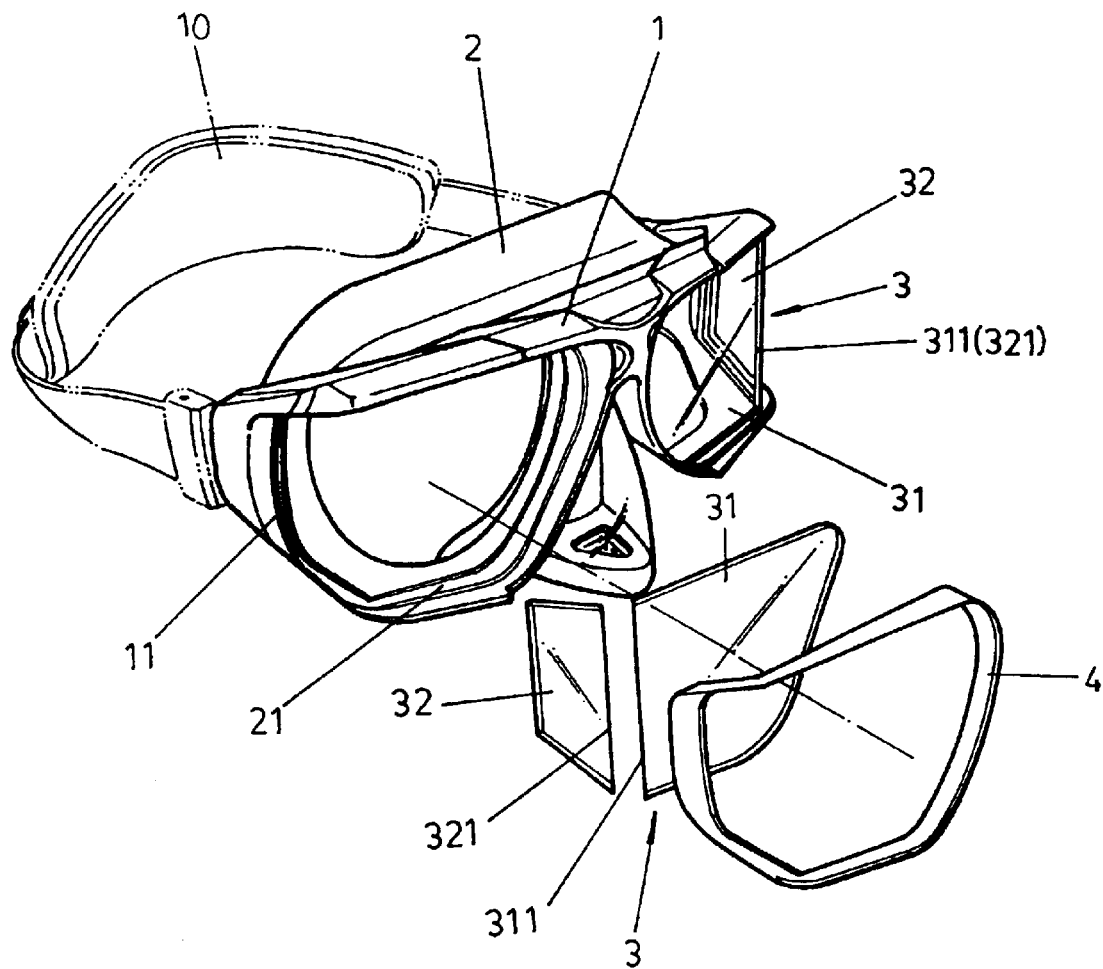
FIG. 2 shows an exploded view of the present invention.

Referring to FIGS. 1 and 2. The present invention is a panoramic-view diving mask comprising a hard plastic frame body 1, a soft silicone skirt 2, a head strap 10, two lens assembly 3, and two lens assembly rings 4, wherein a soft silicone skirt 2 is located inside the frame body 1, a frontal lens 31 and a side lens 32 of dual-window lens assembly 3 is located inside the lens frame opening 21, and the lens assembly ring 4 is located around each lens assembly 3.

The lens assembly 3 is formed by assembling the frontal lens 31 to the side lens 32 while a layer of elastic gasket medium A, is attached to or applied to either one or both surfaces of the contacting edges 311 and 321 of the frontal lens 31 and side lens 32, respectively. The side lens 32 is then inlaid into the frame groove 11, which can be molded-in or an assembled body, formed on the inner side of the lens frame opening 21. The frontal lens 31 is placed on the front side of the lens frame opening 21 to allow the contacting edge 311 of the frontal lens 31 to come in contact with the contacting edge 321 of the side lens 32. The lens assembly ring 4 is pressed against the frontal lens 31 and side lens 32 simultaneously to force the contacting edges of 311 and 321 to press tightly together meanwhile compressing the elastic gasket medium to create a watertight seal of this non-glued and removable self-sealing lens assembly of a panoramic-view diving mask.

Referring to FIGS. 3~1 to 3~3. A non-glued, water-tight and removable self-sealing lens assembly 3 can be done by applying or attaching a layer of elastic gasket medium A to either one or both surfaces of the contacting edges 311 and 321 of the front lens 31 and the side lens 32, respectively.

Figure 4:
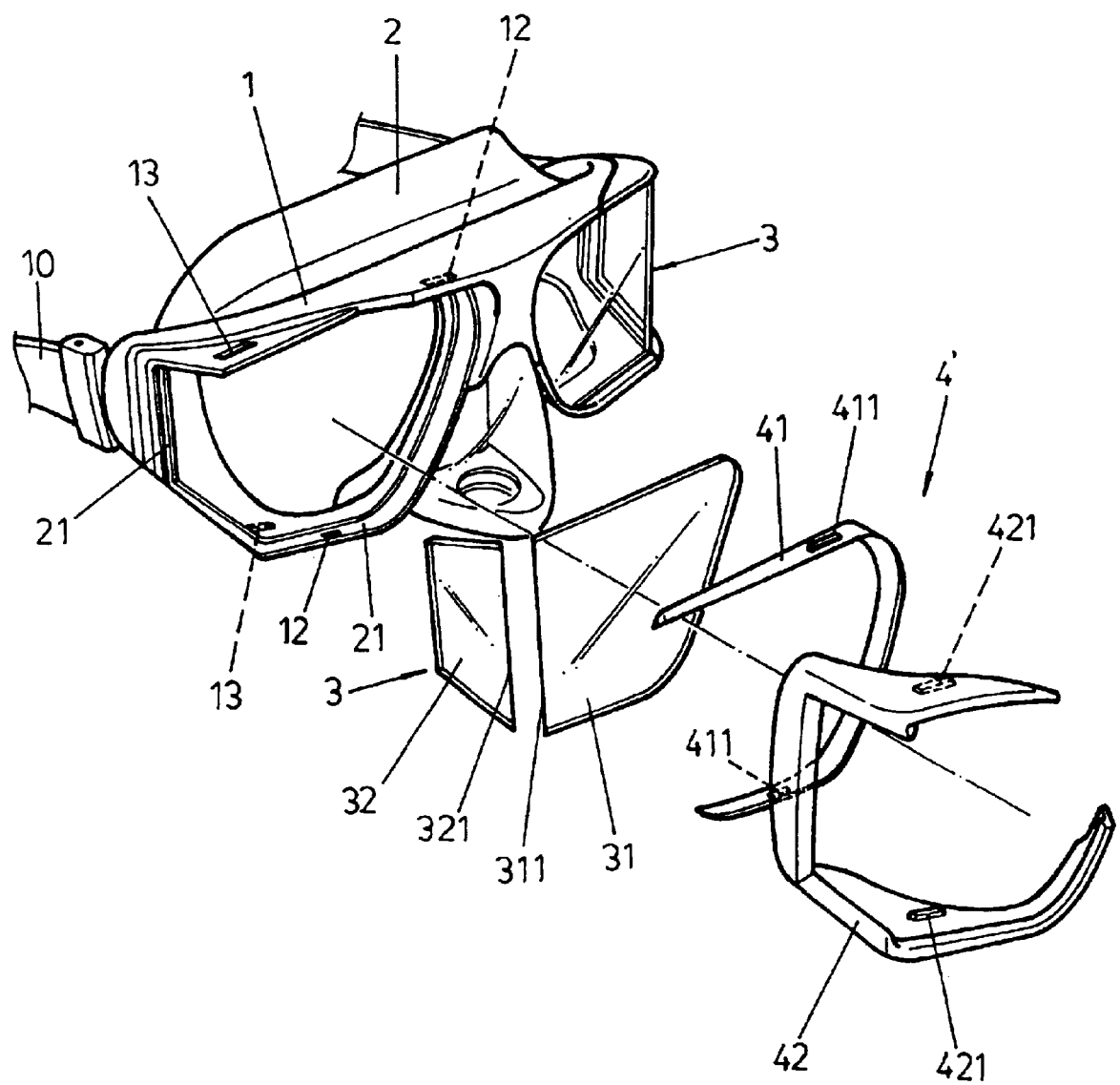
FIG. 4 shows an exploded view of the present invention.

Referring to FIG. 4, the lens assembly ring 4' comprises a front partial ring 41 and side partial ring 42, upon which protruding tabs 411 and 421 are respectively located. The dual-window lens assembly 3 comprises the frontal lens 31 and the side lens 32 with a layer of elastic gasket medium A applied to or attached to either one or both surfaces of the contacting edges 311 and 321 of the frontal lens 31 and side lens 32, respectively. The side lens 32 is placed into the lateral side of the lens frame opening 21 then the side partial ring 42 presses against the side lens 32 while engaging the protruding tab 421 of the side partial ring 42 to both slots 13 located on the surface of the upper and lower section of the mask frame body 1, thereby stationing side lens 32 in the lens frame opening 21. The frontal lens 31 is then placed into the front side of the lens frame opening 21 and is pressed against by the front partial ring 41 while inserting the protruding tab 411 of the front partial ring 41 into both slots 12 located on the inner surface of the upper and lower section of the mask frame body 1, to force the contacting edges of 311 and 321 to press tightly together meanwhile compressing the elastic gasket medium in between to create a watertight seal of this non-glued, removable self-sealing lens assembly of a panoramic-view diving mask.

Figure 5:
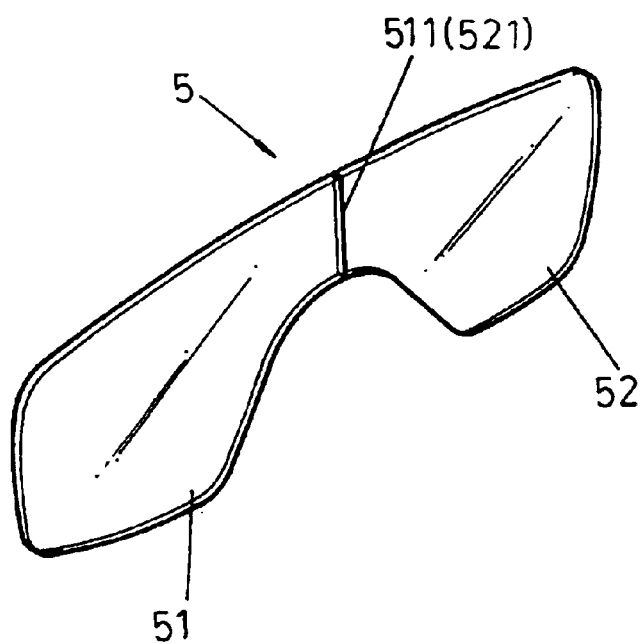
FIG. 5 shows a perspective view of a single-window mask of the present invention.
Figure 6:
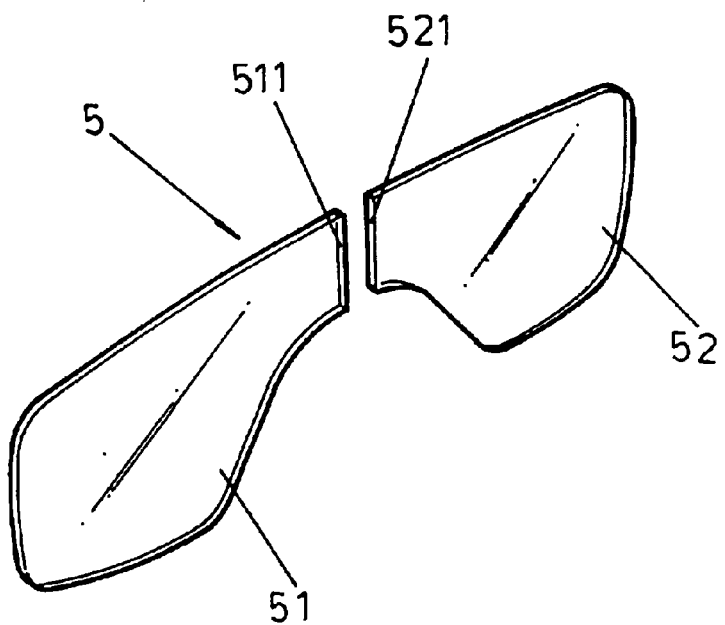
FIG. 6 shows an exploded view of the single-window mask of the present invention.

Referring to FIGS. 5~6, the present invention applies to the diving mask having a single-window lens assembly 5. A self sealing water-tight, single-window lens assembly 5 is assembled with the left-half lens 51 and the right-half lens 52 having a layer of elastic gasket medium B attached to or applied to one or both surfaces of the contacting edges 511 and 521 of the left-half lens 51 and right-half lens 52, respectively. With the non-glued, yet watertight and removable self-sealing lens assembly 5 described herein, individual users can easily replace a lens that is broken, scratched or corrected for near- or far-sighted vision.

The embodiments described herein clearly demonstrate the improved method of the lens assembly of a panoramic-view diving mask without the application of adhesive, and void of permanent bonding, to the lenses. This non-glued, watertight and removable self-sealing lens assembly structure will allow the retrofitting of, or replacement of, lenses that are broken or scratched, or needing vision correction without affecting the watertight integrity of the lens assembly. Moreover, the benefit to improvement in productivity and lowering of the costs in manufacturing can be clearly seen. Various modifications of this invention may be contemplated and can be resorted to without departing from the spirit and scope of this invention as defined by the following claims.

I claim:

1. A panoramic-view diving mask with a non-glued, water-tight and removable self-sealing lens assembly structure wherein:

said panoramic-view diving mask comprises a frame body, a soft skirt, at least one lens assembly, at least one lens assembly ring and a head strap which extends from both side portions of the said frame body for fastening around a diver's head;

said lens assembly comprises:

at least one frontal lens with a contacting edge and at least one side lens with a contacting edge;

a layer of elastic gasket medium is applied, or attached, to the surface of at least one said contacting edge of said frontal lens or said side lens;

at least one said lens assembly ring that is located on at least one said frontal lens and at least one said side lens and the said frame body simultaneously forcing the said contacting edge of the said frontal lens to press tightly against the said contacting edge of the said side lens in order to compress a layer of elastic gasket medium to create a water-tight seal; and means for applying or attaching said a layer of elastic gasket medium to the said contacting edges of said frontal lens and said side lens.

2. A panoramic-view diving mask with a non-glued, watertight and removable self-sealing lens assembly structure according to claim 1, wherein said lens assembly ring also comprises:

at least one front partial lens ring having protruding tabs for engaging the built-in slots on the said frame body in order to securely station the said frontal lens;

at least one side partial lens ring having protruding tabs for engaging the built-in slots on the said frame body in order to securely station the said side lens.

3. A panoramic-view diving mask with a non-glued, water-tight and removable self-sealing lens assembly structure according to claim 1, wherein:

said means for applying or attaching said a layer of elastic gasket medium to the said contacting edges of said frontal lens and said side lens comprises:

a layer of elastic gasket medium with printing, lamination, coating or painting on the surfaces of said contacting edges of said frontal lens and said side lens; or a layer of elastic gasket medium that can be inserted in between the said contacting edges of said frontal lens and said side lens.

4. A panoramic-view diving mask with a non-glued, watertight and removable self-sealing lens assembly structure according to claim 3, wherein;

said means for applying or attaching said a layer of elastic gasket medium to the said contacting edges of said frontal lens and said side lens further comprises:

a said layer of elastic gasket medium being applied or attached to both surfaces of said contacting edges of said frontal lens and said side lens; or a said layer of elastic gasket medium being applied or attached to only the surface of said contacting edges of said frontal lens; or a said layer of elastic gasket medium being applied or attached to only the surface of said contacting edges of said side lens.

5. A panoramic-view diving mask with non-glued, water-tight and removable self-sealing lens assembly structure according to claim 1, wherein:

said frame body comprises a molded-in frame groove.

6. A panoramic-view diving mask with non-glued, water-tight and removable self-sealing lens assembly structure according to claim 5, wherein:

said frame groove can be assembled onto the body of the mask.

7. A panoramic-view diving mask with a non-glued, water-tight and removable self-sealing lens assembly structure according to claim 1, wherein:

said lens assembly further comprises:

at least one left lens with a contacting edge and at least one right lens with a contacting edge;

a layer of elastic gasket medium is applied to or attached to the surface of at least one said contacting edge of said left lens or said right lens; or a layer of elastic gasket medium is applied to or attached to both surfaces of said contacting edges of said left lens and said right lens.

* * * * *